United States Patent [19]

Sellstedt et al.

[11] 3,714,150
[45] Jan. 30, 1973

[54] 6-(2,5-DIOXO-4-PHENYL-N-SUBSTITUTED-4-IMIDAZOLINECARBOXAMIDO)PENICILLANIC ACIDS

[75] Inventors: John H. Sellstedt, King of Prussia; Stanley C. Bell, Penn Valley, both of Pa.

[73] Assignee: American Home Products Corporation, New York, N.Y.

[22] Filed: Aug. 25, 1971

[21] Appl. No.: 174,980

[52] U.S. Cl............................260/239.1, 424/271
[51] Int. Cl..............................................C07d 99/16
[58] Field of Search......................260/239.1

[56] References Cited

UNITED STATES PATENTS

| | | | |
|---|---|---|---|
| 3,471,475 | 10/1969 | Clark et al. | 260/239.1 |
| 3,538,083 | 11/1970 | Grant et al. | 260/239.1 |
| 3,621,011 | 11/1971 | Russell et al. | 260/239.1 |

Primary Examiner—Nicholas S. Rizzo
Attorney—Vito Victor Bellino et al.

[57] ABSTRACT

Novel 6-(2,5-dioxo-4-phenyl-N-substituted-4-imidazolidinecarboxamido)penicillanic acids and intermediates are described which are useful as antibacterial agents.

4 Claims, No Drawings

6-(2,5-DIOXO-4-PHENYL-N-SUBSTITUTED-4-IMIDAZOLINECARBOXAMIDO)PENICILLANIC ACIDS

This invention relates to novel penicillins represented by the formula:

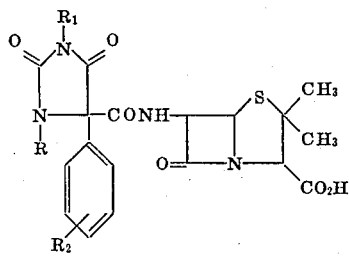

I wherein R and/or $R_1$ is a member selected from the class consisting of hydrogen, (lower)alkyl and aryl(lower)alkyl. $R_2$ is a member selected from the group consisting of hydrogen, (lower)-alkyl, (lower)alkoxy, halo, nitro, hydroxy, and diloweralkyl sulfamyl. $R_2$ is preferably hydrogen.

Also contemplated within the scope of this invention are novel penicillin intermediates represented by the formula:

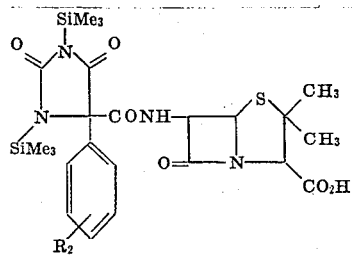

II wherein $R^2$ has the same meaning as in formula I. These compounds are useful as intermediates for preparing compounds of formula I wherein each of R and $R_1$ is hydrogen. The compounds of formula II also have antibacterial activity.

The term "lower alkyl" as employed herein includes both straight and branch chain radicals of $C_1$ through $C_7$ carbons as exemplified by methyl, ethyl, propyl, isopropyl, n-butyl, 1,1-dimethyl butyl, hexyl, etc. The term "aryl(lower)alkyl" means monocyclic and bicyclic carbocyclic aryl lower alkyl radicals exemplified by benzyl, β-phenylethyl, α-phenylpropyl, α-phenyl-ethyl, α-naphthylethyl. The term "halo" means chlorine, bromine, fluorine, and iodine. The term "lower alkoxy" means both straight and branch chain radicals of $C_1$ through $C_7$ carbons as exemplified by methoxy, ethoxy, butoxy, isobutoxy, pentoxy, etc.

The novel products of this invention form salts which are also part of the invention. Non-toxic pharmaceutically acceptable salts of the acidic carboxylic acid group of the penicillin compounds include potassium, calcium, sodium, ammonium, procaine, dibenzylamine, N,N'-dibenzylethylenediamine, N-ethylpiperidine, etc.

The novel penicillins of this invention are prepared according to the following reaction:

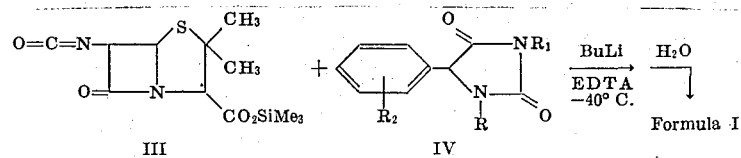

wherein $R_2$ has the same meaning as in formula I and R and $R_1$ are trimethylsilyl, (lower)alkyl and ara(lower)alkyl.

The compound of formula III may be prepared by the procedure described in Example I. The compound of formula IV wherein $R_1$ and $R_2$ is trimethylsilyl may be prepared in the manner described in Example 2. The compounds of formula IV wherein each of R and $R_1$ is other than trimethylsilyl may be prepared in accordance with procedures well-known in the art such as that described by Henze et al., J. Am. Chem. Soc. 64, 522 (1942) and Henze et al., J. Am. Chem. Soc. 76, 4152 (1954).

In carrying out the process of the present invention the use of water as shown in the above reaction sequence is necessary only where $R_1$ and $R_2$ are trimethylsilyl in order to hydrolyze this group and obtain a penicillin compound of formula I wherein each of R and $R_1$ is hydrogen. In other words, in carrying out the process of the present invention, each of the two ring nitrogen atoms of the imidazolidine compounds of formula IV should carry a substituent so that they will remain non-reactive during the formation of the compounds of formula I.

The novel compounds of the present invention are useful as therapeutic agents in poultry and mammals in the treatment of infectious diseases caused by gram-positive and gram-negative bacteria upon parenteral or oral administration. They are also useful in in vitro applications, such as disinfecting compositions.

The following examples serve to illustrate the invention.

EXAMPLE 1

6-isocyanatopenicillanic acid, trimethylsilyl ester

In a 5 liter three-necked flask equipped with stirrer, dropping-funnel, $P_2O_5$-tube and gas inlet tube, through which nitrogen is admitted, 2 liters of toluene and 150.5 g. (697 mmoles) of 6-aminopenicillanic acid are placed. 220 ml. (1579 mmoles) of triethylamine are added and over a period of about 20 min. 250 ml. (approximately 1,980 mmoles) of trimethylchlorosilane are added dropwise. Stirring is continued at room temperature for 2.5 hours after completion of the addition. Another one liter of toluene is added and the temperature is brought to −60°C. Next, 90 ml. (646 mmoles) of triethylamine are added. Then, 112 ml. (about 1.8 mole) of liquid phosgene is added while the temperature of the reaction mixture is kept below −40°C. Stirring is continued for 3 hours at −40°C., at this temperature the precipitate formed is filtered off under nitrogen and washed with 500 ml. of toluene. From the combined filtrate and washing the greater part of the phosgene is removed by evaporation at −40°C. The temperature is then slowly brought to −20°C., under reduced pressure. The remaining traces of phosgene, together with trimethylchlorosilane and triethylamine are removed while the temperature is allowed to slowly rise to +25°C., simultaneously most of the toluene is removed. During the evaporation procedure pressure is maintained between 0.5 and 1.5 mm. Hg. The final volume of the solution is 750 ml. containing 263 mg./ml. of the trimethylsilyl ester of 6-isocyanato penicillanic acid. (yield: 80 percent).

Twenty-five ml. of this solution of the isocyanate in toluene is concentrated under reduced pressure with exclusion of moisture, to a volume of about 10 ml. spontaneous crystallization occurs. 3 ml. of anhydrous toluene are added and the crystalline product is filtered with suction under nitrogen and washed twice with toluene. The crystals are freed from traces of toluene and stored in a nitrogen atmosphere. The yield is about 4 g. of trimethylsilyl ester of 6-isocyanato penicillanic acid having melting point 85° – 88°C. $[\alpha]_D^{20°} = +163.3°C$. in toluene. The molecular weight according to mass spectroscopy is 314.

Analysis: (C, H and N) for $C_{12}H_{18}N_2O_4SSi$:
calc'd (percent): C, 45.86; H, 5.73; N, 8.92
found: (percent): C, 45.92; H, 5.78; N, 8.87

EXAMPLE 2

5-phenyl-1,3-bistrimethylsilylhydantoin

Trimethychlorosilane (21 g., 0.191 mol) is dripped into a mixture of 5-phenyl hydantoin (14 g., 0.0795 mol) and triethylamine (16.15 g., 0.16 mol) in 200 ml. of benzene, and the mixture is refluxed under nitrogen for 2 hr. and kept over night at room temperature. The mixture is filtered under anhydrous conditions and the cake is washed with 100 ml. of boiling benzene. The benzene is distilled off and the residue distilled at 126°–135°/0.1 mm. giving 25 g. of a water white oil which is the above titled product.

Analysis: calc'd for $C_{15}H_{24}N_2O_2Si$:
(percent) C, 56.20; H, 7.52; N, 8.73
found: C, 55.53; H, 7.36; N, 8.59

EXAMPLE 3

6-(2,5-dioxo-4-phenyl-4-imidazolidinecarboxamido)penicillanic acid potassium salt A solution of 6.23 g. (20 mmole.) of 5-phenyl-N,N'-bistrimethylsilyl hydantoin (Example 2) in 20 ml. of dry toluene is cooled to −40°C. A solution of 12.5 ml. of 1.6 N-butyllithium in hexane, 20 ml. of hexane, and 3 ml. of N,N,N',N-tetramethylethylenediamine is dripped into the hydantoin solution at −40°C., and the solution stirred for 2 hrs. A solution 6.3 g., (20 mmol.) of 6-isocyanatopenicillanic acid, trimethylsilyl ester in 20 ml. of toluene is added dropwise over 5 min. and the resulting solution is stirred at −40°C. for 1 hr. 3 ml. of trimethylchlorosilane is added and the solution is allowed to warm to room temperature. This solution contains the compound 6-(2,5-dioxo-1,3-bis-(trimethylsilyl)-4-phenyl-4-imidazolidine carboxamido)penicillanic acid trimethylsilyl ester. The solution is then poured into an ether-ice water mixture, filtered and the water is extracted, once more with ether. The ether is washed with cold, dilute hydrochloric acid, brine and dried with magnesium sulfate. 9 ml. of 2 M potassium 2-ethylhexanoate in 1-butanol is added to the ether to give a white salt which is the above titled compound: NMR($D_2O$) 1.45–1.70 (Broad s, 6, $CH_3$—C—$CH_3$), 4.31 (s, 1, $CHCO_2K$), 5.40–5.75 (Broad m, 2, —N—CHCH), 7.47 (Broad s, 5, aromatic).

EXAMPLE 4

Following the procedure of Example 3, the following compounds may be prepared by reacting 6-isocyanatopenicillanic acid, trimethylsilyl ester with a substituted phenyl hydantoin:

| Hydantoin Derivative | Product |
|---|---|
| 5-phenyl-N,N'-dimethyl hydantoin | 6-(1,3-dimethyl-2,5-dioxo-4-phenyl-4-imidazolidinecarboxamido)penicillanic acid |
| 5-phenyl-N,N'-dibenzyl hydantoin | 6-(1,3-dibenzyl-2,5-dioxo-4-phenyl-4-imidazolidinecarboxamido)penicillanic acid |
| 5-(p-chlorophenyl)-N,N'-bistrimethylsilyl hydantoin | 6-[4-(p-chlorophenyl)-2,5-dioxo-4-imidazolidinecarboxamido]penicillanic acid |
| 5-(p-methoxyphenyl)-N,N'-dimethyl hydantoin | 6-[4(p-methoxyphenyl)-1,3-dimethyl-2,5-dioxo-4-imidazolidinecarboxamido]penicillanic acid |
| 5-(o-nitrophenyl)-N,N'-bistrimethyl hydantoin | 6-[4-(O-nitrophenyl)-1,3-dimethyl-2,5-dioxo-4-imidazolidinecarboxamido]penicillanic acid |
| 5-(p-trimethylsilyloxy)-N,N'-bistrimethyl hydantoin | 6-[4-(p-hydroxyphenyl)-1,3-dimethyl-2,5-dioxo-4-imidazolidinecarboxamido]penicillanic acid |

The compounds of formula I of this invention have been found to possess antibacterial activity. Antibacterial screening is carried out by an agar serial dilution technique. Distilled water is used as a vehicle. The stock solution is prepared at 10,000 µg./ml. of substance in the vehicle. Two-fold dilutions are made with sterile water. 1 ml. quantities of each dilution are incorporated into 9 ml. seed agar in sterile petrie dishes. The hardened surface is inoculated with test organisms and incubated 18 hours at 35°C. The end point is reported as a minimal inhibitory concentration (MIC) expressed in µg./ml.; the least amount of test substance that will completely inhibit the test organism. The compound of Example 3 when tested against Staphylococcus aureus 6538P Staphylococcus aureus Smith, and Bacillus subtillus produced a MIC value in each case of 1.95 µg./ml.

The compounds of this invention may be used in cleaning or disinfecting compositions (e.g., dairy barns) at a concentration of about b 0.1 to 1 percent by weight of such compositions dissolved or suspended in a suitable inert carrier for application by washing or spraying.

What is claimed is:

1. A member selected from the group consisting of the compounds having the formula:

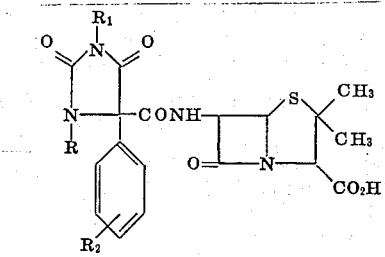

wherein R and $R_1$ are members selected from the class consisting of hydrogen, (lower)alkyl, aryl(lower)alkyl and trimethylsilyl, the word aryl meaning phenyl or naphthyl; $R_2$ is a member selected from the class consisting of hydrogen, (lower)alkyl, (lower) alkoxy, halo, nitro, hydroxy, and diloweralkylsulfamyl; and the non-toxic addition salts thereof.

2. A compound according to claim 2 wherein $R_2$ is hydrogen.

3. The compound of claim 1 which is: 6-(2,5-dioxo-1,3-bis-(trimethylsilyl)-4-phenyl-4-imidazolidinecarboxamido)penicillanic acid trimethylsilyl ester.

4. The compound of claim 1 which is: 6-(2,5-dioxo-4-phenyl-4-imidazolidinecarboxamido) penicillanic acid.

* * * * *